E. J. BARRETT.
CHART PUZZLE.
APPLICATION FILED JAN. 15, 1913. RENEWED APR. 6, 1915.
1,148,885.
Patented Aug. 3, 1915.
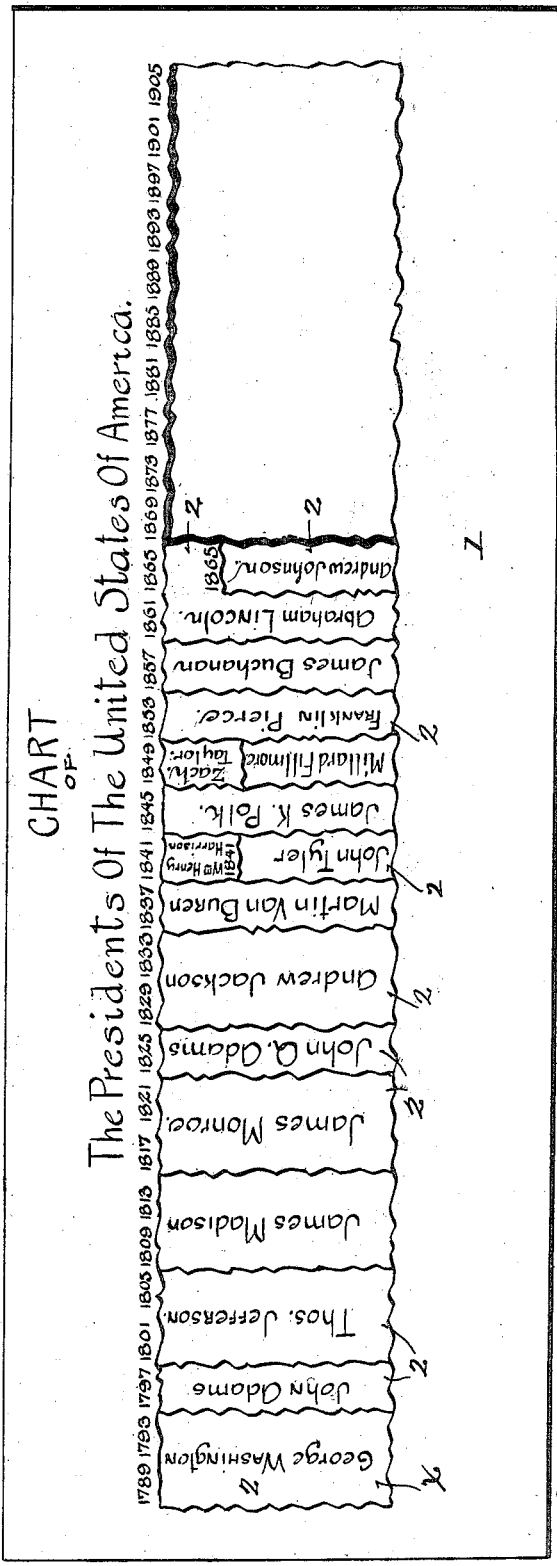
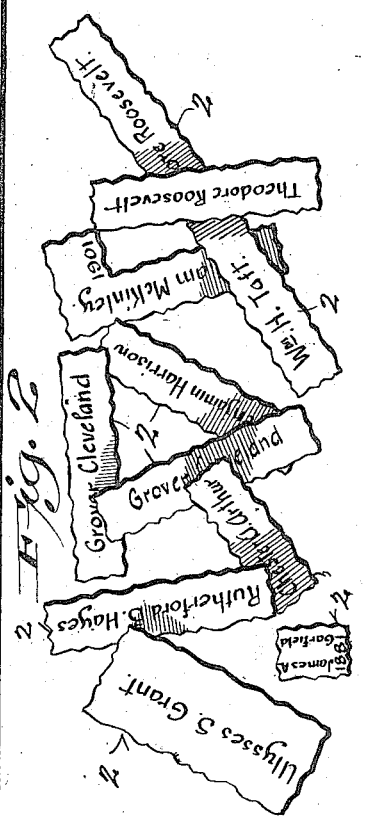
Witnesses:
Inventor:
Edward J. Barrett.
Attorneys.

UNITED STATES PATENT OFFICE.

EDWARD J. BARRETT, OF SHEBOYGAN, WISCONSIN.

CHART-PUZZLE.

1,148,885.  Specification of Letters Patent.  Patented Aug. 3, 1915.

Application filed January 15, 1913, Serial No. 742,123. Renewed April 6, 1915. Serial No. 19,557.

*To all whom it may concern:*

Be it known that I, EDWARD J. BARRETT, a citizen of the United States, and resident of Sheboygan, in the county of Sheboygan and State of Wisconsin, have invented certain new and useful Improvements in Chart-Puzzles; and I do hereby declare that the following is a full, clear, and exact description thereof.

My invention has for its object to provide a simple, economical and useful educational chart puzzle, the same consisting of what is herein described with reference to the accompanying drawings and subsequently claimed.

In carrying out my invention I propose to utilize a chart of chronologically tabulated historical or biblical events, or charts of values, areas or the like.

In the drawings Figure 1 represents a chart puzzle showing the Presidents of the United States in their chronological order, together with the terms of office of each President, the said chart being provided with removable blocks having the names of the various Presidents thereon, the blocks being of various proportions relative to the terms of such Presidents, and Fig. 2, a face view of a miscellaneous group of the blocks, the same being arranged to fit within the chart body in their order.

Referring by characters to the drawings, 1 represents a chart body having a headline of periods indicated by dates from 1787 to 1905 inclusive. These headline dates are arbitrarily spaced apart to represent a series of historical units, the same comprising one term of office of four years. Directly below the headline dates the body of the calendar is cut away into blocks 2 having irregular edges that are adapted to fit corresponding upper and lower irregular cut edges of the body of said chart and also having side edges adapted to articulate with each other when said blocks are seated in their proper relative positions. Each of the blocks has printed thereon the name of a President and for example, the first block *x* of the series has printed thereon the name of the first President, George Washington, the second John Adams, and so on up to a block having the name of President Roosevelt thereon, which block is adapted to fit under the date 1905, the last named block being shown as one of the group in Fig. 2.

All of these blocks are proportioned so as to approximately correspond in relative areas to the length of time served by the name of the President thereon, and, for example, the last block fitted in the chart, marked Abraham Lincoln, is cut into L shape indicating that his term of office was interrupted during a second period and the remainder of said second period is formed into a separate block with the name of the President Andrew Johnson who filled out the unexpired term, these two men having together completed two terms. The single term of Zachary Taylor having been interrupted, was, as shown by the chart, filled out by Millard Fillmore, attention being called to the fact that these broken terms are shown by sectional cubes or blocks, in relative proportions to the time served.

In solving the puzzle, it is apparent that when the blocks are stacked in a detached group the scholar being required to replace the same in their order with reference to the date line of the chart body, can, with a limited knowledge, in a general way, determine the positions of the various blocks by reading the headline dates, it being apparent by giving the matter some thought, that the block having the name thereon of James Madison would not fit under any of the dates high up in the chart and with this clue the said block can readily be fitted under the right period and so on through the entire chart body aperture, each block is fitted to its period. Thus in an assembling of this character, the child is called upon to use some judgment and general knowledge, while after so applied it is apparent that the physical arrangement of the blocks will have a tendency to impress upon the student firmly the historical events so charted in their chronological order.

The chart illustrated simply shows one example of carrying out my invention, it being understood that the same principles can be applied to biblical puzzle charts, periods of finance, compilation of values or analogous data for educational purposes to thus impress the subject and the arrangement more firmly upon the mind.

I claim:

1. A puzzle chart comprising a body provided with arbitrarily arranged indices and having blocks irregularly cut from the chart body under the indices, the proportionate area of each block approximating the value of the index under which it is adapted to fit, the blocks being provided with symbolic markings associated with the indices.

2. A puzzle chart comprising a body provided with chronologically arranged dates and having blocks irregularly cut from the chart body under the dates, the size of each block being in approximate proportion relative to the period of time indicated by the date under which it is adapted to fit, the blocks being provided with suitable markings associated with said dates.

In testimony that I claim the foregoing I have hereunto set my hand, at Port Washington, in the county of Ozaukee and State of Wisconsin, in the presence of two witnesses.

EDWARD J. BARRETT.

Witnesses:
   Le Roy A. Henze,
   Edward J. Altendorf.